No. 693,418. Patented Feb. 18, 1902.
W. R. MONTGOMERY.
COFFEE OR TEA POT ATTACHMENT.
(Application filed June 4, 1901.)
(No Model.)
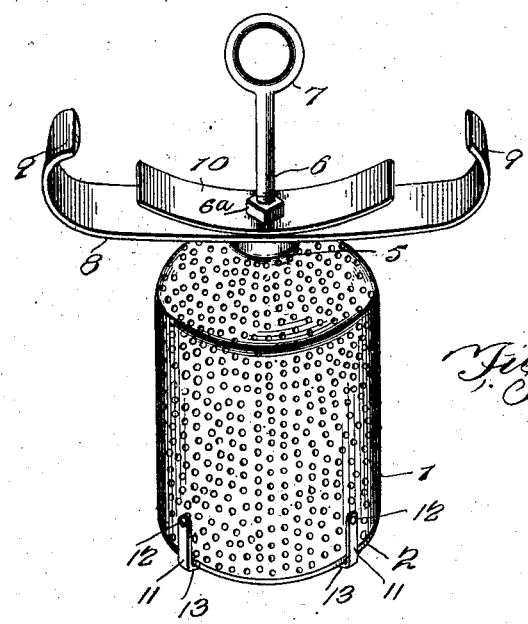
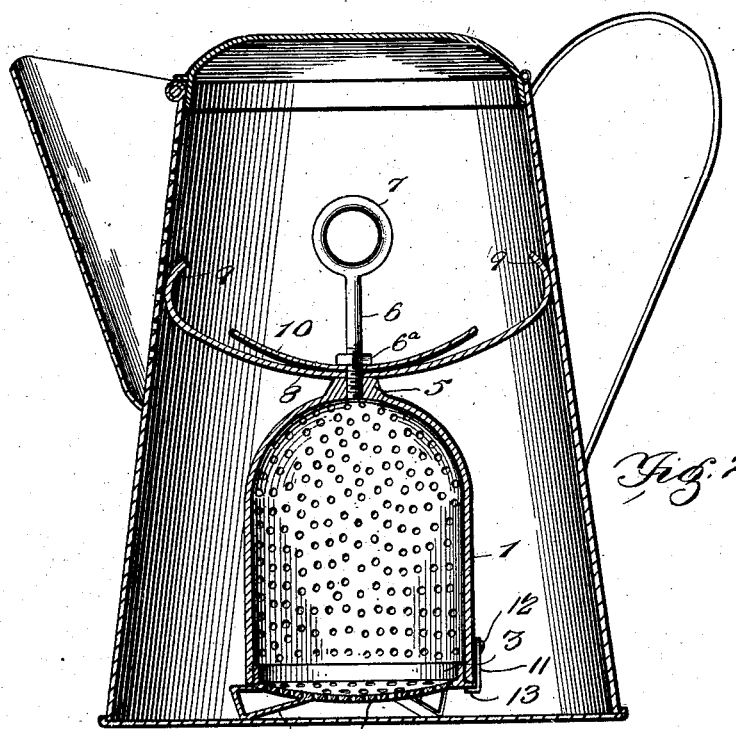
Witnesses
W. R. Montgomery, Inventor
by C. A. Snow & Co
Attorneys

UNITED STATES PATENT OFFICE.

WALTER REGINALD MONTGOMERY, OF SHREVEPORT, LOUISIANA.

COFFEE OR TEA POT ATTACHMENT.

SPECIFICATION forming part of Letters Patent No. 693,418, dated February 18, 1902.

Application filed June 4, 1901. Serial No. 63,151. (No model.)

*To all whom it may concern:*

Be it known that I, WALTER REGINALD MONTGOMERY, a citizen of the United States, residing at Shreveport, in the parish of Caddo and State of Louisiana, have invented a new and useful Coffee or Tea Pot Attachment, of which the following is a specification.

This invention relates to improvements in tea or coffee pot attachments; and it consists in a removable and detachable device for holding the charge of tea or coffee and adapted to be inserted into the coffee or tea pot while the desirable parts are being extracted and which will provide for the retention of the charge and preventing it from becoming diffused throughout the boiling water and will also provide for the removal of the "grounds" after the steeping process is completed.

In the drawings illustrative of the invention, Figure 1 is a perspective view of the device complete. Fig. 2 is a sectional side elevation of a tea or coffee pot with my improved device arranged therein.

The device may be adapted to fit any size or form of tea or coffee pot and will be varied in size according to the requirements.

The device consists of a perforated metal body portion or receptacle 1, preferably circular in shape and with rounded upper end and with a removable bottom 2, the latter formed with an upwardly-projecting annular rim 3, projecting into the portion 1, by which it may be removably connected to the receptacle or body portion. The rim 3 will be formed to fit the receptacle 1 sufficiently tight to support the charge of tea or coffee and prevent it from droping out when the device is being placed in or removed from the coffee or tea pot when used in smaller-sized coffee or tea pots, but will be provided with spring-catcher 11, having inwardly-bent ends 13 to engage the bottom 2 and secured to the body of the receptacle 1, as by rivet 12, when larger vessels are employed. The bottom 2 will be preferably formed of perforated metal or wire-gauze, the same as the sides of the body portion, and will be provided with feet 4 to support it above the bottom of the coffee-pot, so that the water will freely circulate beneath it, whereby the hot water will have free access to all parts.

Projecting from the top of the receptacle 1 is an enlargement 5, in which a rod 6 is secured and projecting upward, as shown, and terminating in a loop or ring 7 for convenience in handling the device. The rod 6 may be secured in the enlargement in any desired manner, either by screwing, riveting, or soldering or in any other suitable manner. The enlargement thus affords an ample and necessary support to the rod and insures a firm and rigid connection of the rod with the receptacle. The enlargement also greatly strengthens the connection by distributing the strains over a larger surface of the receptacle, and thereby preventing the strains from coming at one point only of the comparatively thin perforated metal of which the receptacle is composed.

8 is a flat spring-plate secured to the rod 6 above the enlargement 5 and with curved extremities, as at 9. This plate extends laterally and engages the interior sides of the coffee or tea pot to afford a support to the device and keep it in its central position and prevent it from either tipping over when the coffee or tea pot is tilted in the act of pouring from the spout or when being moved from place to place. The curving of the ends will enable the device to be forced into the coffee-pot without abrading its interior and will also enable the spring-plate to readily adapt itself to all the irregularities of the interior surface and retain the device at all times in its proper relation to the coffee-pot.

10 represents an additional or reinforcing strip attached to the rod 6 above the strip 8 to increase its resiliency, if required.

Two of the strips 8 may be employed, if required, arranged at right angles to each other and each having the curved ends, so that the device will be supported from four points instead of from two only, as when one spring-plate is employed.

By this simple device the charge of tea or coffee may be placed in the receptacle and the receptacle inserted into the pot by crowding it downward therein, the spring-plate 8 yielding to the downward pressure and insuring the retention of the device in its proper position. When the process of infusion has been completed, the device may be removed, if required. The device is thus adapted to fit any size or form of pot or receptacle, and one of the devices may be employed in connection with two or more pots, if required. The charge of tea or coffee is thus retained in a compact shape and not permitted to become mingled with the extraction or pass out through the spout as grounds, and the grounds may be removed as soon as the extraction is complete, which is desirable under some circumstances.

In coffee or tea pots having a reduced inlet or top opening, as in some forms of earthenware pots, the ends of the strip 8 may require to be curved downward instead of upward to provide for its insertion into the contracted inlets; but the action would be substantially the same, and such a modification would not be a departure from the spirit of my invention.

The rod 6 thus performs the double function of a handle to the receptacle and as a means for assisting in retaining the spring-plates in position upon the receptacle, and to increase the efficiency in the latter respect the rod 6 will preferably be provided with an enlargement or nut $6^a$ to firmly support the plates 9 and 10. This greatly strengthens the connection and effectually prevents the displacement of the plates.

What I claim as new is—

In a tea or coffee pot, a perforated receptacle for the charge of tea or coffee open at the lower end, a closure for said open end of the receptacle with means for detachably connecting it to said receptacle, downwardly-projecting feet on said closure adapted to support the receptacle above the surface upon which it rests, a rod secured in and extending vertically above the top of said receptacle and providing a handle for said receptacle, transverse spring-plates mounted on the said rod above the top of the receptacle and provided with extended curved extremities to engage the interior of the pot, a shorter plate held on said spring-plates to regulate the resiliency of the latter, and a movable holding device mounted on the rod and bearing against the said shorter plate.

In testimony that I claim the foregoing as my own I have hereto affixed my signature in the presence of two witnesses.

WALTER REGINALD MONTGOMERY.

Witnesses:
 F. C. O'LEARY,
 J. E. CROOM.